US012637008B2

(12) United States Patent
Taniguchi

(10) Patent No.: US 12,637,008 B2
(45) Date of Patent: May 26, 2026

(54) DISPLAY DEVICE AND DISPLAY SYSTEM

(71) Applicant: Alps Alpine Co., LTD, Tokyo (JP)

(72) Inventor: Keita Taniguchi, Iwaki (JP)

(73) Assignee: ALPS ALPINE CO., LTD., Tokyo (JP)

( * ) Notice: Subject to any disclaimer, the term of this patent is extended or adjusted under 35 U.S.C. 154(b) by 647 days.

(21) Appl. No.: 17/975,100

(22) Filed: Oct. 27, 2022

(65) Prior Publication Data

US 2023/0136052 A1      May 4, 2023

(30) Foreign Application Priority Data

Nov. 2, 2021     (JP) ................................. 2021-179602

(51) Int. Cl.
B60R 1/12          (2006.01)
B60K 35/234       (2024.01)
(Continued)

(52) U.S. Cl.
CPC .............. B60R 1/12 (2013.01); B60K 35/234 (2024.01); B60K 35/40 (2024.01); B60K 35/81 (2024.01);
(Continued)

(58) Field of Classification Search
CPC ... B60R 1/12; B60R 1/083; B60R 2001/1253; B60R 1/26; G02F 1/133502;
(Continued)

(56) References Cited

U.S. PATENT DOCUMENTS 5,798,809  A  *   8/1998  Nakamura  .......... G02F 1/13363
                                               349/119
10,649,264  B2     5/2020  Xue et al.
(Continued)

FOREIGN PATENT DOCUMENTS

EP          3264169  A1     1/2018
JP       2008-191310  A     8/2008
                (Continued)

OTHER PUBLICATIONS

Satake et al. (CN 100378476), Adhesive Optical Film And Image Display Device. (Year: 2008).*

(Continued)

*Primary Examiner* — Bumsuk Won
*Assistant Examiner* — Rahman Abdur
(74) *Attorney, Agent, or Firm* — Crowell & Moring LLP

(57)                    ABSTRACT

A display device and a display system are provided with an anti-glare layer (AG layer) between a liquid crystal display on which to display a video and an optical device that is disposed at a position through which image light emitted from the liquid crystal display passes, has a reflective polarizing plate, and is capable of controlling reflectance/ transmittance of incident light. Since light reflected by a color filter of the liquid crystal display is out of phase due to scattering in the AG layer, the degree of interference is reduced, leading to reduction in the appearance of an iridescent image due to interference light. In addition, since external light scattered or diffused by the AG layer and the reflected light of the external light do not have a polarization characteristic, and thus, most of a component thereof toward the outside is reflected by the reflective polarizing plate, which reduces a situation in which a region around a bright reflected image appears cloudy.

16 Claims, 5 Drawing Sheets

(51) Int. Cl.

| | | |
|---|---|---|
| *B60K 35/40* | (2024.01) | |
| *B60K 35/81* | (2024.01) | |
| *B60R 1/08* | (2006.01) | |
| *G02F 1/1335* | (2006.01) | |

(52) U.S. Cl.

CPC ........ *B60R 1/083* (2013.01); *G02F 1/133502* (2013.01); *G02F 1/133536* (2013.01); *B60R 2001/1253* (2013.01)

(58) Field of Classification Search

CPC ......... G02F 1/133536; G02F 1/133528; G02F 1/133504; G02F 1/133562; B60K 35/234; B60K 35/40; B60K 35/415; B60K 35/81; B60K 2360/1523; B60K 2360/23; B60K 35/22; B60K 37/00

USPC ....................................................... 359/603

See application file for complete search history.

(56) References Cited

U.S. PATENT DOCUMENTS

| | | |
|---|---|---|
| 11,173,840 B2 | 11/2021 | Watatsu et al. |
| 11,453,340 B2 | 9/2022 | Oishi |
| 12,158,656 B2 | 12/2024 | Ohira et al. |

| | | | | |
|---|---|---|---|---|
| 2013/0242230 | A1* | 9/2013 | Watanabe | G02F 1/133504 |
| | | | | 349/64 |
| 2015/0260882 | A1* | 9/2015 | Furui | G02B 5/0221 |
| | | | | 345/173 |
| 2017/0082895 | A1* | 3/2017 | Sakai | G02B 5/3041 |
| 2019/0031105 | A1* | 1/2019 | Kim | B60R 1/081 |
| 2019/0351827 | A1* | 11/2019 | Xue | G02F 1/13318 |
| 2021/0001778 | A1* | 1/2021 | Oishi | G02F 1/0136 |

FOREIGN PATENT DOCUMENTS

| | | |
|---|---|---|
| JP | 2019-084988 | 6/2019 |
| JP | 2019-174705 | 10/2019 |
| JP | 6624193 | 12/2019 |
| JP | 2020-506439 | 2/2020 |
| JP | 2020-106654 | 7/2020 |
| JP | 2020-118992 A | 8/2020 |
| JP | 2020-149021 | 9/2020 |
| JP | 2021-054208 | 4/2021 |
| WO | WO 2014/112525 A1 | 7/2014 |
| WO | WO 2015/141350 A1 | 9/2015 |

OTHER PUBLICATIONS

Notification of Reasons for Refusal and English Translation for Japanese Patent Application No. 2021-179602, Oct. 31, 2024, 8 pp.

* cited by examiner

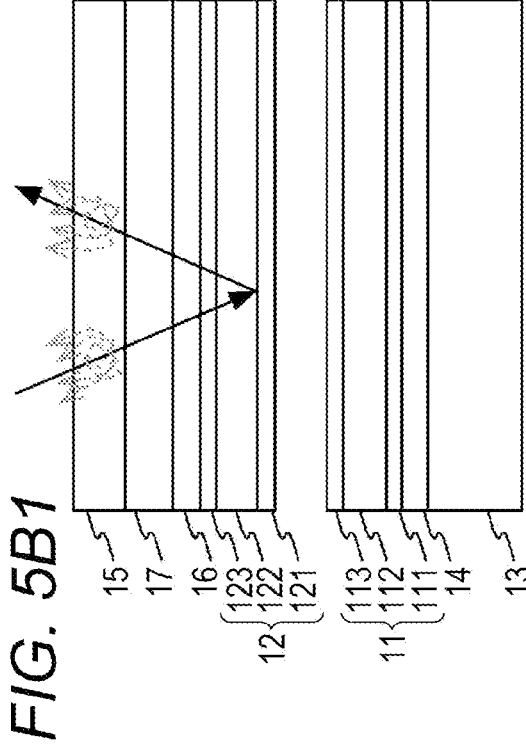
*FIG. 5A1*
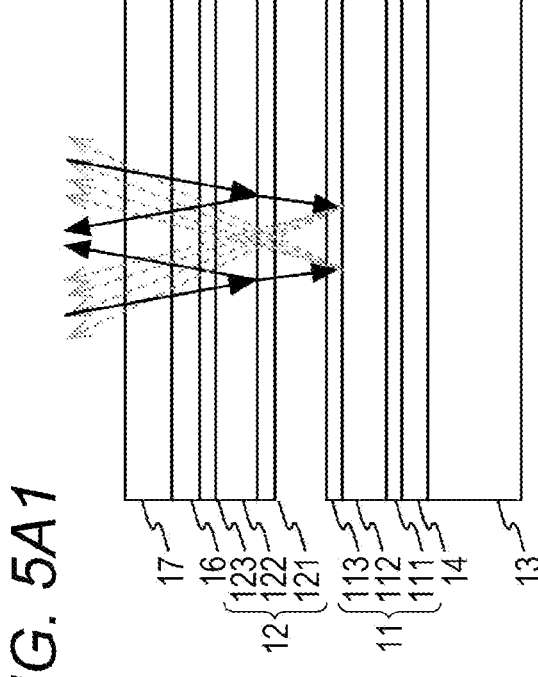
*FIG. 5B1*
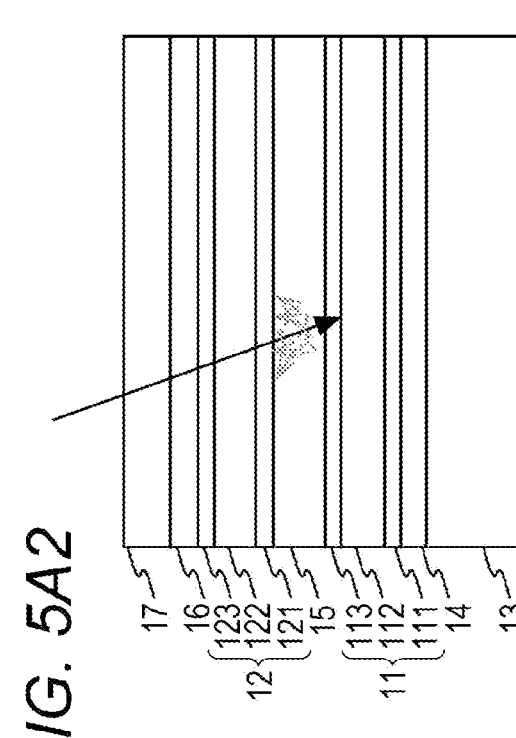
*FIG. 5A2*

DISPLAY DEVICE AND DISPLAY SYSTEM

RELATED APPLICATION

The present application claims priority to Japanese Patent Application Number 2021-179602, filed Nov. 2, 2021, the entirety of which is hereby incorporated by reference.

BACKGROUND

1. Field of the Invention

The present invention relates to a display device capable of selectively functioning as a mirror.

2. Description of the Related Art

Known examples of a display device capable of selectively functioning as a mirror include a display device in which an optical device capable of controlling reflectance/transmittance of incident light is disposed so as to face a screen of a liquid crystal display (e.g., refer to JP 6624193 B2). Here, the optical device controls the reflectance/transmittance by changing a rate of division of the incident light into reflected light and transmitted light. If the reflectance is increased, the transmittance is decreased, and if the reflectance is decreased, the transmittance is increased.

Further, known examples of a display device capable of selectively functioning as a mirror include a display device in which a half mirror partially reflecting external light is disposed so as to face a screen of an image display device and an anti-glare layer is provided on a surface of the half mirror on which external light is incident (e.g., refer to JP 2020-118992 A and JP 2008-191310 A).

In this case, since the transmittance of the optical device is increased during anti-glare, the ratio of external light that passes through the optical device to reach the screen of the liquid crystal display is increased. On the other hand, the external light that has reached the screen is reflected by the screen, passes through the optical device again, and is emitted to the outside, and the emitted light includes interference light caused by diffraction by a color filter of the liquid crystal display. For this reason, when the reflectance of the optical device is decreased for anti-glare, a problem that an iridescent image due to the interference light, which does not actually exist, appears behind the vehicle around a bright reflected image.

In light of the above, it is conceivable to apply an anti-glare configuration of the display device using the half mirror and to provide an anti-glare layer on the surface, on which the external light is incident, of the optical device capable of controlling the reflectance/transmittance to achieve anti-glare.

However, this causes a problem that, in a state where the optical device is controlled to have high reflectance in order to function as a mirror, a region around the bright reflected image appears cloudy due to scattering and diffusion of light by the anti-glare layer.

SUMMARY

In light of the above, an object of the present disclosure is to achieve good anti-glare without problems in a display device in which an optical device capable of controlling reflectance/transmittance of incident light is disposed so as to face a screen of a display.

In order to achieve the object described above, according to the present disclosure, a display device capable of selectively functioning as a mirror includes a display configured to emit image light; an optical device that is disposed on a first direction side of the display so as to overlap a screen of the display when viewed in the first direction and is configured to control reflectance/transmittance of incident light, the first direction being an emission direction of the image light of the display; and an anti-glare layer that is provided between the display and the optical device in the first direction so as to overlap the screen of the display when viewed in the first direction and is configured to perform at least one of scattering and diffusion of incident light. The display emits, as the image light, linearly polarized light in a predetermined direction, and the optical device includes a reflective polarizing plate having a polarizing transmission axis in the predetermined direction, a liquid crystal panel that is disposed on the first direction side of the reflective polarizing plate and is configured to change a direction of a vibration plane of incident linearly polarized light for emission, and a polarizing plate that is disposed on the first direction side of the liquid crystal panel and has a polarizing transmission axis in the predetermined direction.

In the display device, the display is a liquid crystal display, for example.

In the display device, it is preferable that the anti-glare layer has a haze value of 30% or more.

The display devices may be disposed at an upper part of a front windshield of a vehicle so that image light is emitted toward a rear direction of the vehicle.

Alternatively, the display devices may be disposed at a side part of a front door of a vehicle so that image light is emitted toward a rear direction of the vehicle.

Further, a display system having an anti-glare function may include: the display device mounted in a vehicle; a light detection unit configured to detect intensity of light coming from behind the vehicle; and an anti-glare control unit configured to control, according to the intensity of the light detected by the light detection unit, the reflectance/transmittance of the optical device so that the reflectance is decreased and the transmittance is increased as the intensity of the light is increased.

According to the display device or the display system having the structure in which the anti-glare layer is disposed between the optical device and the display as described above, the action of scattering or diffusion of the anti-glare layer and the action of reflection by the reflective polarizing plate of the optical device suppress occurrence of problems such as appearance of an iridescent image due to interference of light reflected on the display and cloudiness around a bright reflected image.

As described above, according to the present disclosure, it is possible to achieve good anti-glare without problems in a display device in which an optical device capable of controlling reflectance/transmittance of incident light is disposed so as to face a screen of a display.

BRIEF DESCRIPTION OF THE DRAWINGS

FIG. 3 is a diagram that schematically illustrates the configuration of a display device according to an embodiment of the present invention;

FIGS. 4A to 4B2 are diagrams that illustrate basic operations of a display device according to an embodiment of the present invention; and FIGS. 5A1 to 5B2 are diagrams that illustrate an effect of an AG layer according to an embodiment of the present invention.

DETAILED DESCRIPTION OF THE PREFERRED EMBODIMENTS

Hereinafter, an embodiment of the invention will be described.

Figure 1:
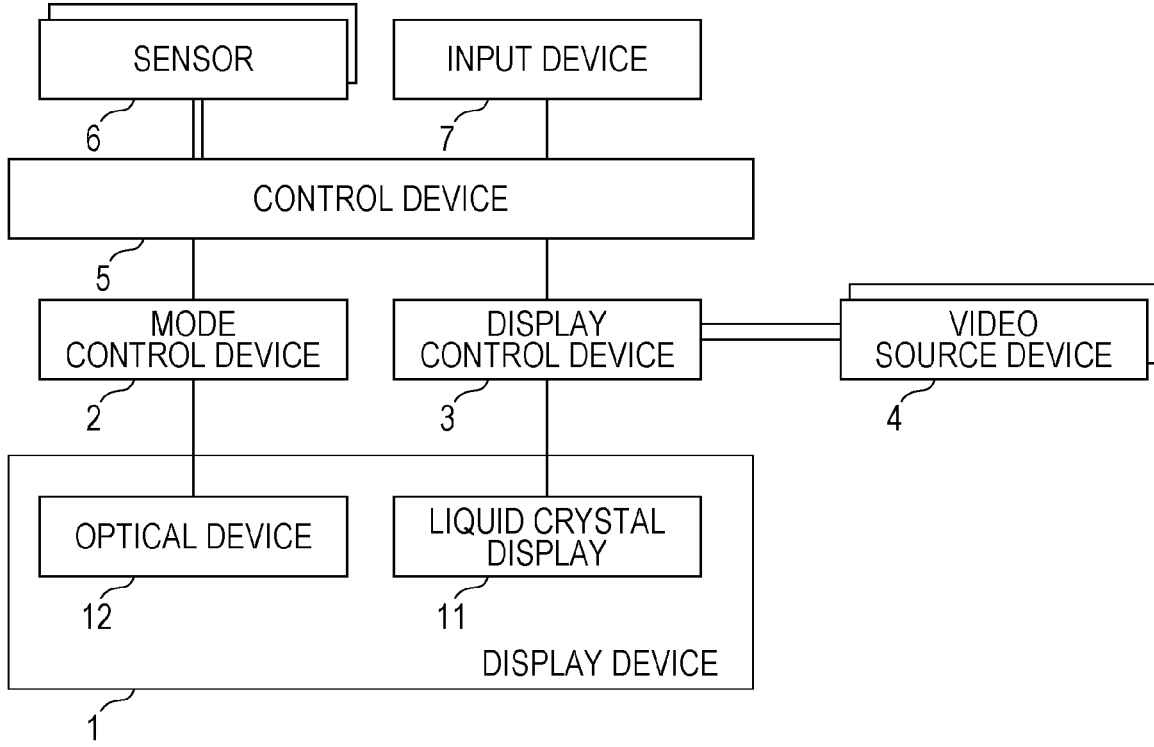
FIG. 1 is a block diagram that illustrates the configuration of a display system according to an embodiment of the present invention.

FIG. 1 illustrates the configuration of a display system according to the present embodiment.

The display system is a system mounted on or in a vehicle, and as illustrated in FIG. 1, the display system includes a display device 1, a mode control device 2, a display control device 3, one or more video source devices 4, a control device 5, a plurality of sensors 6, and an input device 7.

The display device 1 is a device that can be caused to selectively function as a mirror and a device for displaying a video, and the display device 1 includes a liquid crystal display 11 on which to display a video, and an optical device 12 that is disposed at a position through which image light emitted from the liquid crystal display 11 passes and is capable of controlling reflectance/transmittance of incident light.

Figure 2:
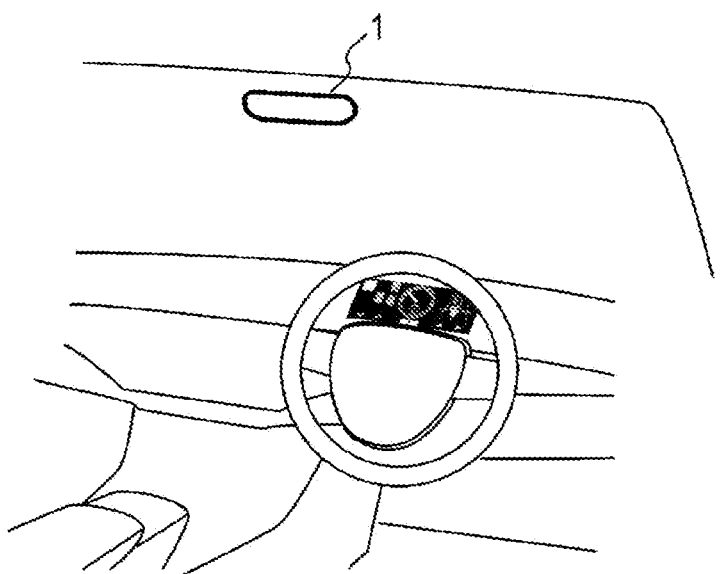
FIG. 2 is a diagram that illustrates an arrangement of a display device according to an embodiment of the present invention.

For example, as illustrated in FIG. 2, the display device 1 is disposed at a position where a rearview mirror has been conventionally provided on an upper part of a front windshield of a vehicle. In a display mode in which the display device 1 is caused to function as the device for displaying a video, the display device 1 can be used as a display on which to display various types of information, and in a mirror mode in which the display device 1 is caused to function as a mirror, the display device 1 can be used as a rearview mirror.

Note that the display device 1 may be disposed at a position where a wing mirror has been conventionally provided on a side part of a front door of a vehicle. In this case, in the display mode, the display device 1 can be used as the display on which to display various types of information, and in the mirror mode, the display device 1 can be used as the wing mirror.

Returning back to FIG. 1, the video source device 4 is a back camera for capturing an image of the rear view of the vehicle and a device for outputting other videos, and the display control device 3 controls the display of the video output by the video source device 4 on the liquid crystal display 11 under the control of the control device 5.

The mode control device 2 adjusts the reflectance/transmittance of the optical device 12 under the control of the control device 5.

The plurality of sensors 6 include an illuminance sensor for detecting surrounding brightness, an optical sensor for detecting the intensity of light coming from behind the vehicle, and other sensors.

The control device 5 performs processing for switching the video source device 4 that is the output source of the video displayed on the liquid crystal display 11 by the display control device 3 in accordance with a user operation or the like received by the input device 7.

Further, the control device 5 switches between the display mode and the mirror mode of the display device 1 in accordance with a user operation or the like received by the input device 7. Further, during a period in which a detection value of the illuminance sensor indicates that the surroundings are dark, the control device 5 sets an anti-glare level so as to be increased as the light intensity is increased, according to the intensity of the light coming from behind detected by the optical sensor. Note that the control device 5 sets the anti-glare level to the minimum level at which anti-glare is not performed during a period in which the detection value of the illuminance sensor indicates that the surroundings are not dark.

However, the surrounding brightness and the intensity of light coming from behind may be determined in the control device 5 based on a video output by the back camera provided as the video source device 4.

In the display mode, the control device 5 controls the mode control device 2 to adjust the reflectance/transmittance of the optical device 12 and set at low reflectance/high transmittance so that the display device 1 functions as the device for displaying a video.

In the mirror mode, the control device 5 controls the display control device 3 to turn off the display and controls the mode control device 2 to adjust the reflectance/transmittance of the optical device 12 so that the display device 1 functions as the mirror and that the reflectance is decreased and the transmittance is increased as the anti-glare level is increased. More specifically, during the mirror mode, at the minimum level of the anti-glare level, the mode control device 2 is controlled to adjust the reflectance/transmittance of the optical device 12 and set at high reflectance/low transmittance, and the mode control device 2 is caused to control the reflectance/transmittance of the optical device 12 so that the reflectance is decreased and the transmittance is increased as the anti-glare level is increased. Here, as the reflectance of the optical device 12 is decreased and the transmittance is increased, the degree of anti-glare of the display device 1 in the mirror mode is increased.

Therefore, during the mirror mode, the higher the intensity of light coming from behind is, the greater the degree of anti-glare of the optical device 12 is.

Figure 3:
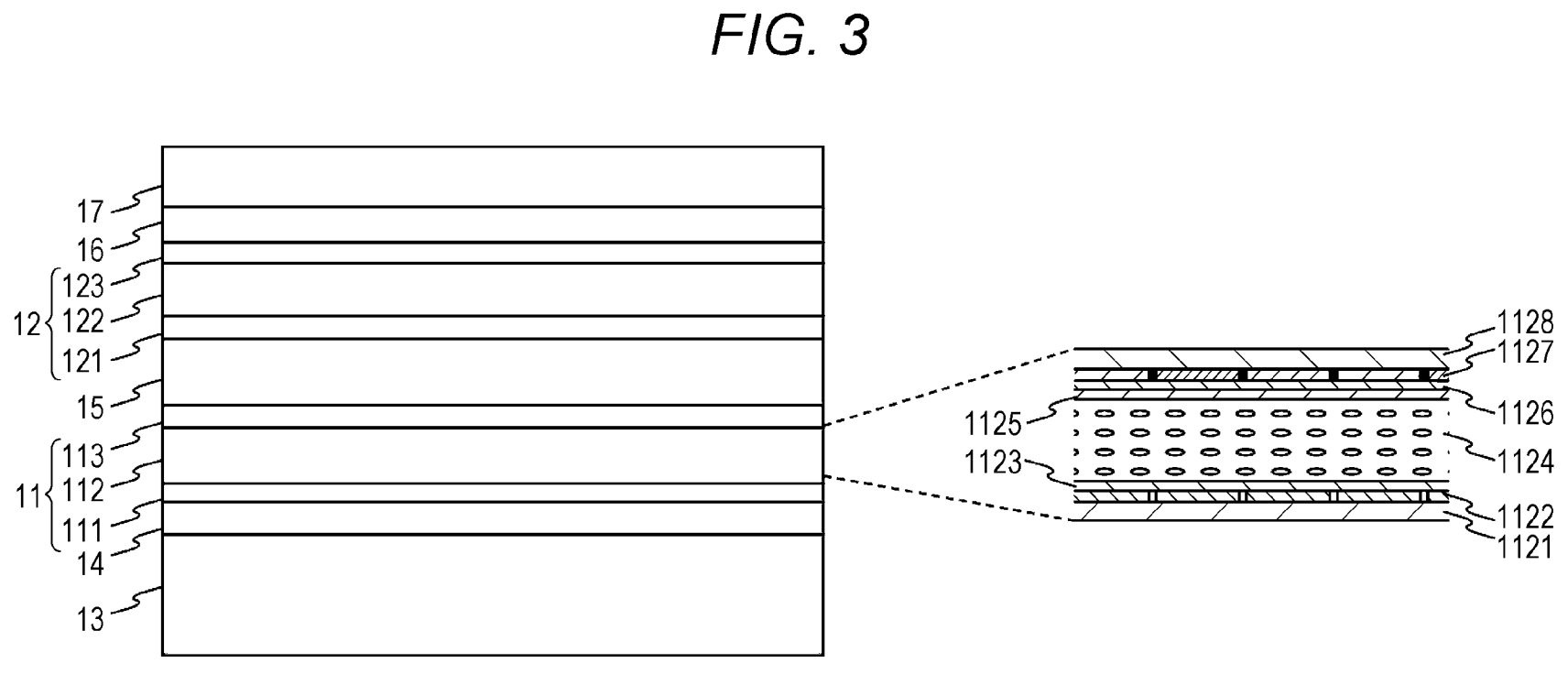

Next, FIG. 3 schematically illustrates the configuration of the display device 1.

As illustrated in FIG. 3, the display device 1 has, from the back to the front thereof, a structure in which are stacked a backlight 13 for emitting display illumination light, an air gap or an optical clear adhesive (OCA: optical clear adhesive sheet) 14, a backlight polarizing plate 111, a display liquid crystal panel 112, an image light polarizing plate 113, an anti-glare layer (AG layer) 15, a reflective polarizing plate 121, a mode switching liquid crystal panel 122, an external light polarizing plate 123, an air gap or an OCA 16, and a cover glass 17.

The backlight polarizing plate 111, the display liquid crystal panel 112, and the image light polarizing plate 113 constitute the liquid crystal display 11.

In the liquid crystal display 11, the direction of a polarizing transmission axis of the image light polarizing plate 113 is set to a first direction, and the direction of a polarizing transmission axis of the backlight polarizing plate 111 is set to a second direction that is orthogonal to the first direction. Only a component of linearly polarized light in the second direction of the display illumination light emitted from the backlight 13 passes through the backlight polarizing plate 111 to enter the display liquid crystal panel 112. In the display liquid crystal panel 112, a vibration plane of the display illumination light is adjusted to a desired direction for each pixel, colored, and emitted to the image light polarizing plate 113. The image light polarizing plate 113 transmits only a component of linearly polarized light in the first direction of the display illumination light entering from the display liquid crystal panel 112, and emits the resultant as image light representing a video.

Further, the display liquid crystal panel 112 has, from the back to the front of the display device 1, a structure in which are stacked a back transparent substrate 1121, a pixel electrode 1122, a back orientation film 1123, a liquid crystal layer 1124, a front orientation film 1125, a counter electrode 1126, a color filter and black matrix 1127, and a front transparent substrate 1128.

The pixel electrode 1122 and the counter electrode 1126 control, for each pixel, an effective voltage applied to the liquid crystal layer 1124, so that the orientation of the liquid crystal can be controlled for each pixel to adjust the vibration plane of the display illumination light emitted from the liquid crystal layer 1124 and set at a desired direction. Here, the display illumination light emitted from the liquid crystal layer 1124 is colored for each pixel by the color filter 1127, emitted to the image light polarizing plate 113, and a component of the display illumination light that has passed through the image light polarizing plate 113 becomes image light.

In the display device 1, the reflective polarizing plate 121, the mode switching liquid crystal panel 122, and the external light polarizing plate 123 constitute the optical device 12.

The polarizing transmission axes of the external light polarizing plate 123 and the reflective polarizing plate 121 are set to the first direction which is the same as that of the polarizing transmission axis of the image light polarizing plate 113 of the liquid crystal display 11. The reflective polarizing plate 121 is an optical device that transmits linearly polarized light in the direction of the polarizing transmission axis and reflects linearly polarized light in a direction orthogonal to the polarizing transmission axis, and since the polarizing transmission axis is the first direction herein, the reflective polarizing plate 121 transmits linearly polarized light in the first direction and reflects linearly polarized light in the second direction that is the direction orthogonal to the first direction.

The mode switching liquid crystal panel 122 can control the orientation of the liquid crystal in the mode switching liquid crystal panel 122, adjust the vibration plane of the linearly polarized light incident on the mode switching liquid crystal panel 122 and set at a desired direction to emit the resultant.

The operation of the display device 1 in the display mode and the mirror mode will now be described.

Figure 4A:
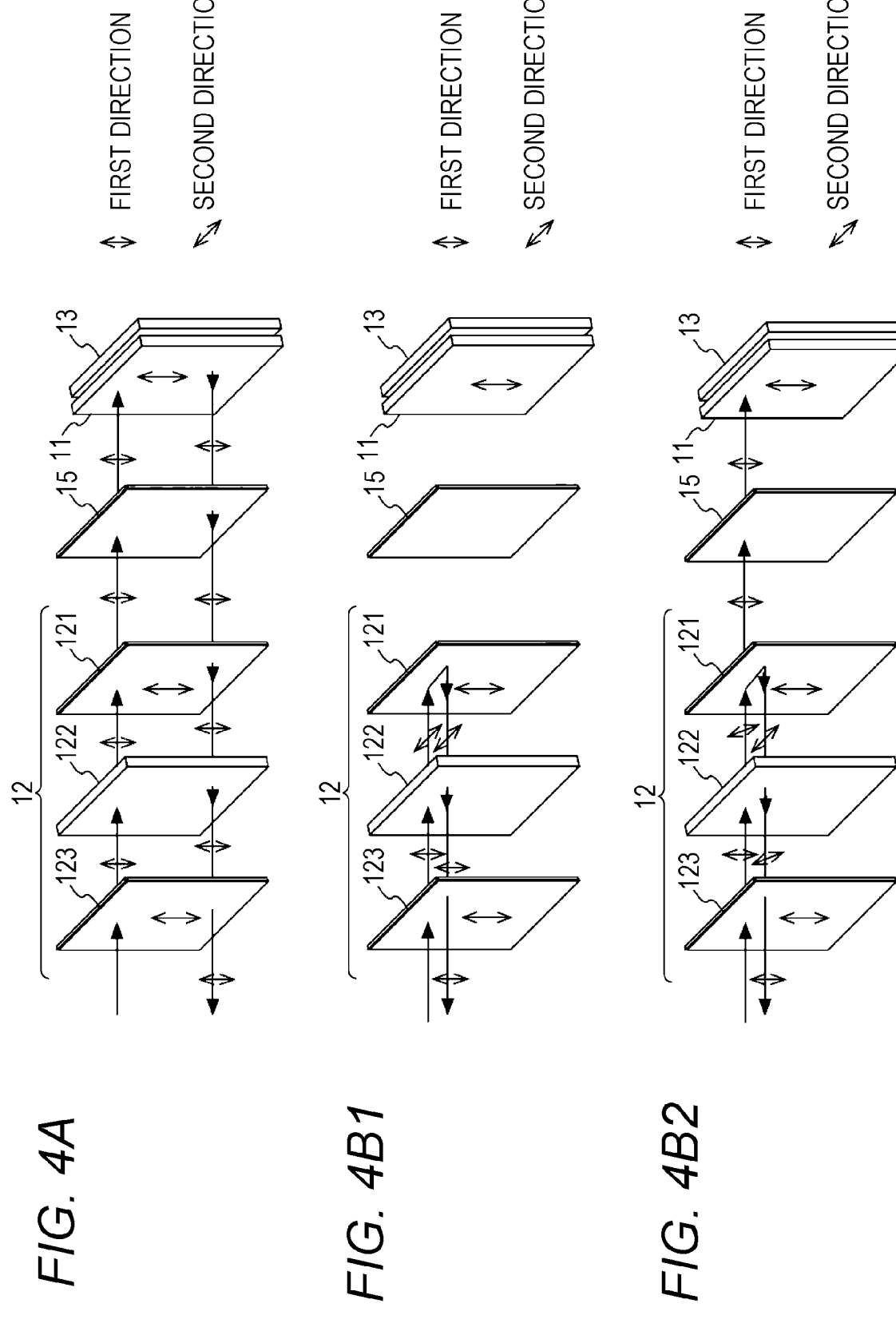

First, FIG. 4A illustrates a basic operation of the display device 1 in the display mode with the cover glass 17, the air gap, and the OCA not involved in the operation omitted.

In the display mode, the mode control device 2 controls the mode switching liquid crystal panel 122 to emit linearly polarized light while maintaining the vibration plane of the incident linearly polarized light as it is.

A component of the linearly polarized light in the first direction of external light that has entered the external light polarizing plate 123 passes through the external light polarizing plate 123 having the polarizing transmission axis in the first direction, and passes through the mode switching liquid crystal panel 122 with the direction of the vibration plane maintained in the first direction. The linearly polarized light in the first direction that has passed through the mode switching liquid crystal panel 122 passes through the reflective polarizing plate 121 having the polarizing transmission axis in the first direction, passes through the AG layer 15 to enter the liquid crystal display 11, and thereafter, most of the linearly polarized light is absorbed therein.

On the other hand, as described above, the image light containing only the linearly polarized light in the first direction is emitted from the liquid crystal display 11. The image light emitted from the liquid crystal display 11 passes through the AG layer 15 and the reflective polarizing plate 121 having the polarizing transmission axis in the first direction to enter the mode switching liquid crystal panel 122. The image light that has entered the mode switching liquid crystal panel 122 passes through the mode switching liquid crystal panel 122 with the direction of the vibration plane maintained in the first direction, directly passes through the external light polarizing plate 123 having the polarizing transmission axis in the first direction, and is emitted to the outside. The image light emitted to the outside is then used to display a video.

Next, FIGS. 4B1 and 4B2 illustrate a basic operation of the display device 1 in the mirror mode with the cover glass 17, the air gap, and the OCA not involved in the operation omitted.

FIG. 4B1 illustrates the basic operation for a case where the anti-glare level is the lowest level in the mirror mode, that is, for a case where anti-glare is not performed.

In the mirror mode, the display control device 3 controls the liquid crystal display 11 not to emit image light by turning off the backlight 13 or displaying a black screen. Further, in a case where the anti-glare level is the lowest level in the mirror mode, the mode control device 2 controls the mode switching liquid crystal panel 122 to rotate, by 90 degrees, the vibration plane of the incident linearly polarized light.

A component of the linearly polarized light in the first direction of external light that has entered the external light polarizing plate 123 passes through the external light polarizing plate 123 having the polarizing transmission axis in the first direction, the direction of the vibration plane is rotated by 90 degrees in the mode switching liquid crystal panel 122 to enter the reflective polarizing plate 121 as the linearly polarized light in the second direction. Since the external light entering from the mode switching liquid crystal panel 122 is linearly polarized light in the second direction that is orthogonal to the polarizing transmission axis in the first direction, the reflective polarizing plate 121 reflects all of the external light. The reflected light of the linearly polarized light in the second direction reflected by the reflective polarizing plate 121 is incident on the mode switching liquid crystal panel 122, the vibration plane of the reflected light is rotated by 90 degrees in the mode switching liquid crystal panel 122, the reflected light is emitted to the external light polarizing plate 123 as the linearly polarized light in the first direction, and directly passes through the external light polarizing plate 123 having the polarizing transmission axis in the first direction, and is emitted to the outside. Then, the function of the display device 1 as the mirror is realized by the reflected light emitted to the outside.

Even if the display is made in the liquid crystal display 11 at the lowest level of the anti-glare level in the mirror mode, the image light of the linearly polarized light in the first direction emitted from the liquid crystal display 11 passes through the AG layer 15 and the reflective polarizing plate 121, the vibration plane of the image light is rotated by 90 degrees in the mode switching liquid crystal panel 122, the image light enters the external light polarizing plate 123 as the linearly polarized light in the second direction, is blocked by the external light polarizing plate 123, and therefore, the video on the liquid crystal display 11 is not displayed and output externally. Thus, when the anti-glare level is the lowest level in the mirror mode, control may be performed such that the image light is emitted from the liquid crystal display 11.

Next, FIG. 4B2 illustrates the basic operation for a case where the anti-glare level is not the lowest level in the mirror mode, that is, for a case where the anti-glare is performed.

As described above, in the mirror mode, the display control device 3 controls the liquid crystal display 11 not to emit image light by turning off the backlight 13 or displaying a black screen. Further, in a case where the anti-glare level is not the lowest level in the mirror mode, the mode control device 2 controls the mode switching liquid crystal panel 122 to rotate the vibration plane of the incident linearly polarized light by an angle θ determined according to the anti-glare level within a range of 0<θ<90 degrees. As the angle of rotation of the vibration plane is decreased in the mode switching liquid crystal panel 122, the reflectance of the optical device 12 is decreased and the transmittance thereof is increased. Therefore, the higher the anti-glare level is, the smaller the angle of rotation of the vibration plane is in the mode switching liquid crystal panel 122.

A component of the linearly polarized light in the first direction of external light that has entered the external light polarizing plate 123 passes through the external light polarizing plate 123 having the polarizing transmission axis in the first direction, the direction of the vibration plane is rotated by θ degrees in the mode switching liquid crystal panel 122 to enter the reflective polarizing plate 121 as the linearly polarized light in a direction between the first direction and the second direction.

The reflective polarizing plate 121 reflects the component of the linearly polarized light in the second direction of the external light entering from the mode switching liquid crystal panel 122 and transmits the component of the linearly polarized light in the first direction of the incident external light. Thus, the reflective polarizing plate 121 reflects a part of the external light entering from the mode switching liquid crystal panel 122 and transmits a part thereof.

The reflected light of the linearly polarized light in the second direction reflected by the reflective polarizing plate 121 is incident on the mode switching liquid crystal panel 122, the vibration plane of the reflected light is rotated by θ in the mode switching liquid crystal panel 122 and emitted to the external light polarizing plate 123, and the external light polarizing plate 123 emits, to the outside, a component of the linearly polarized light in the first direction of the reflected light entering from the mode switching liquid crystal panel 122. Then, the function of the display device 1 as the mirror is realized by the reflected light emitted to the outside, and the intensity of the reflected light emitted to the outside, namely, the reflectance of the optical device 12 can be made lower than that when the anti-glare level is the lowest level, so that the anti-glare corresponding to the anti-glare level is realized.

On the other hand, the external light of the linearly polarized light in the first direction that has passed through the reflective polarizing plate 121 passes through the AG layer 15 to enter the liquid crystal display 11, and thereafter, most of the external light is absorbed therein.

As illustrated in FIG. 4B2, when the display is made on the liquid crystal display 11 in a state where the vibration plane of the linearly polarized light incident on the mode switching liquid crystal panel 122 is rotated by the angle θ, the image light of the linearly polarized light in the first direction emitted from the liquid crystal display 11 passes through the AG layer 15 and the reflective polarizing plate 121, and the vibration plane is rotated by the angle θ in the mode switching liquid crystal panel 122 to enter the external light polarizing plate 123, and the external light polarizing plate 123 emits, to the outside, the component of the linearly polarized light in the first direction of the image light entering from the mode switching liquid crystal panel 122.

Therefore, in this case, the image reflected by the reflective polarizing plate 121 and the video displayed on the liquid crystal display 11 superimposed on each other are visually recognized by the user.

The display system may further have a combination mode in which the mode switching liquid crystal panel 122 is controlled so as to rotate, by the angle θ, the vibration plane of the incident linearly polarized light, and an icon or the like is displayed on the liquid crystal display 11, so that such a reflected image and the displayed image are displayed in a superimposed manner. Also in the combination mode, the higher the anti-glare level is, the smaller the angle of rotation of the vibration plane is in the mode switching liquid crystal panel 122, so as to achieve anti-glare.

Next, an effect of providing the AG layer 15 of the display device 1 between the liquid crystal display 11 and the reflective polarizing plate 121 in the present embodiment is described.

As illustrated in FIG. 5A1, in the case of the display device 1 without the AG layer 15, when anti-glare is performed in the mirror mode, external light reaches the liquid crystal display 11 as illustrated in FIG. 4B2, is diffracted and reflected by the color filter 1127 illustrated in FIG. 3, and interference light of the reflected light rays is emitted from the front face of the display device 1. Then, due to the interference light, an iridescent image, which does not actually exist, appears behind the vehicle around a bright reflected image.

On the other hand, in the display device 1 of the present embodiment in which the AG layer 15 is provided between the liquid crystal display 11 and the reflective polarizing plate 121, as illustrated in FIG. 5A2, the light reflected by the color filter 1127 of the liquid crystal display 11 is out of phase due to scattering in the AG layer 15, so that the degree of interference is reduced, leading to reduction in appearance of an iridescent image due to interference light.

Next, as illustrated in FIG. 5B1, in a case where the AG layer 15 is provided on the surface of the display device 1 on which the external light is incident, in the mirror mode in which the anti-glare level is low, that is, in a state in which the reflectance/transmittance of the optical device 12 is high reflectance/low transmittance, a region around a bright reflected image appears cloudy due to scattering and diffusion of external light and reflected light of the external light by the AG layer 15.

On the other hand, as illustrated in FIG. 5B2, in the display device 1 of the present embodiment, external light scattered or diffused by the AG layer 15 between the liquid crystal display 11 and the reflective polarizing plate 121 and reflected light of the external light do not have a polarization characteristic, and thus, most of a component thereof toward the outside is reflected by the reflective polarizing plate 121. Therefore, such light is not emitted to the outside, and a region around a bright reflected image does not appear cloudy.

Although the AG layer 15 also acts on image light emitted from the liquid crystal display 11, the influence on the image light is small as with the case where the AG layer 15 is provided on the screen of the liquid crystal display 11.

Here, in order to sufficiently obtain the effect of the AG layer 15 as described above, the AG layer 15 has a haze value (haze; opacity) of 30% or more, desirably 40% or more. According to an experiment conducted by the present inventors, when the haze value is less than 30%, the appearance of a strong iridescent image cannot be reduced; when the haze value is 30% or more, the appearance of an iridescent image can be reduced to such an extent that there is no practical problem; and when the haze value is 40% or more, the appearance of an iridescent image can be favorably reduced. The upper limit of the haze value may be determined according to the usage and a required image quality.

An embodiment of the present invention has been described.

Although the case where the liquid crystal display 11 is provided in the display device is described above, a display other than the liquid crystal display may be used instead of the liquid crystal display 11 as long as the display emits the image light of the linearly polarized light.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display device capable of selectively functioning as a mirror, the display device comprising:

a display configured to emit image light;

an optical device that is disposed on a first direction side of the display so as to overlap a screen of the display when viewed in the first direction and is configured to selectively control reflectance and transmittance of incident light, the first direction being an emission direction of the image light of the display; and the display device comprises an anti-glare layer that is disposed between an image-light polarizing plate of the display and a reflective polarizing plate of the optical device having a haze value of 30% or more that is provided between the display and the optical device in the first direction so as to overlap the screen of the display when viewed in the first direction and is configured to perform at least one of scattering and diffusion of incident light, wherein the display emits, as the image light, linearly polarized light in a predetermined direction, and the optical device includes a reflective polarizing plate having a polarizing transmission axis in the predetermined direction, a liquid crystal panel that is disposed on the first direction side of the reflective polarizing plate and is configured to selectively change a direction of a vibration plane of incident linearly polarized light for emission, and a polarizing plate that is disposed on the first direction side of the liquid crystal panel and has a polarizing transmission axis in the predetermined direction, wherein scattering or diffusion by the anti-glare layer causes light reflected by a color filter of the display to become out of phase so as to reduce interference and suppress an iridescent image, and external light scattered or diffused by the anti-glare layer and a reflected portion thereof is substantially depolarized such that a majority of a component directed toward the outside is reflected by the reflective polarizing plate.

2. The display device according to claim 1, wherein the display is a liquid crystal display.

3. The display device according to claim 1, wherein the liquid crystal panel is configured to selectively rotate the vibration plane of incident linearly polarized light.

4. The display device according to claim 1, wherein the display device is disposed at an upper part of a front windshield of a vehicle so that image light is emitted toward a rear direction of the vehicle.

5. The display device according to claim 1, wherein the display device is disposed at a side part of a front door of a vehicle so that image light is emitted toward a rear direction of the vehicle.

6. A display system comprising:

a display device capable of selectively functioning as a mirror, the display device comprising:

a display configured to emit image light;

an optical device that is disposed on a first direction side of the display so as to overlap a screen of the display when viewed in the first direction and is configured to selectively control reflectance and transmittance of incident light, the first direction being an emission direction of the image light of the display; and the display device comprises an anti-glare layer disposed between an image-light polarizing plate of the display and a reflective polarizing plate of the optical device having a haze value of 30% or more that is provided between the display and the optical device in the first direction so as to overlap the screen of the display when viewed in the first direction and is configured to perform at least one of scattering and diffusion of incident light, wherein the display emits, as the image light, linearly polarized light in a predetermined direction, and the optical device includes a reflective polarizing plate having a polarizing transmission axis in the predetermined direction, a liquid crystal panel that is disposed on the first direction side of the reflective polarizing plate and is configured to selectively change a direction of a vibration plane of incident linearly polarized light for emission, and a polarizing plate that is disposed on the first direction side of the liquid crystal panel and has a polarizing transmission axis in the predetermined direction;

a light detection unit configured to detect intensity of light coming from the first direction; and an anti-glare control unit configured to control, according to the intensity of the light detected by the light detection unit, the reflectance and transmittance of the optical device so that the reflectance is decreased and the transmittance is increased as the intensity of the light is increased, wherein scattering or diffusion by the anti-glare layer causes light reflected by a color filter of the display to become out of phase so as to reduce interference and suppress an iridescent image, and external light scattered or diffused by the anti-glare layer and a reflected portion thereof is substantially depolarized such that a majority of a component directed toward the outside is reflected by the reflective polarizing plate.

7. The display system according to claim 6, wherein the display is a liquid crystal display.

8. The display system according to claim 6, wherein the liquid crystal panel is configured to selectively rotate the vibration plane of incident linearly polarized light.

9. The display system according to claim 6, wherein the display device is disposed at an upper part of a front windshield of a vehicle so that image light is emitted toward a rear direction of the vehicle.

10. The display system according to claim 6, wherein the display device is disposed at a side part of a front door of a vehicle so that image light is emitted toward a rear direction of the vehicle.

11. A display device capable of selectively functioning as a mirror, the display device comprising:

a display configured to emit image light, wherein the display is a liquid crystal display;

an optical device that is disposed on a first direction side of the display so as to overlap a screen of the display when viewed in the first direction and is configured to selectively control reflectance and transmittance of incident light, the first direction being an emission direction of the image light of the display; and the display device comprises an anti-glare layer disposed between an image-light polarizing plate of the display and a reflective polarizing plate of the optical device that is provided between the display and the optical device in the first direction so as to overlap the screen of the display when viewed in the first direction and is configured to perform at least one of scattering and diffusion of incident light, wherein the display emits, as the image light, linearly polarized light in a predetermined direction, the anti-glare layer has a haze value of 30% or more, and the optical device includes a reflective polarizing plate having a polarizing transmission axis in the predetermined direction, a liquid crystal panel that is disposed on the first direction side of the reflective polarizing plate and is configured to selectively change a direction of a vibration plane of incident linearly polarized light for emission, and a polarizing plate that is disposed on the first direction side of the liquid crystal panel and has a polarizing transmission axis in the predetermined direction, wherein scattering or diffusion by the anti-glare layer causes light reflected by a color filter of the display to become out of phase so as to reduce interference and suppress an iridescent image, and external light scattered or diffused by the anti-glare layer and a reflected portion thereof is substantially depolarized such that a majority of a component directed toward the outside is reflected by the reflective polarizing plate.

12. The display device according to claim 11, wherein the anti-glare layer has a haze value of 40% or more.

13. The display device according to claim 11, wherein the display device is disposed at an upper part of a front windshield of a vehicle so that image light is emitted toward a rear direction of the vehicle.

14. The display device according to claim 11, wherein the display device is disposed at a side part of a front door of a vehicle so that image light is emitted toward a rear direction of the vehicle.

15. The display device according to claim 11, further comprising a light detection unit configured to detect intensity of light coming from the first direction; and an anti-glare control unit configured to control, according to the intensity of the light detected by the light detection unit, the reflectance and transmittance of the optical device so that the reflectance is decreased and the transmittance is increased as the intensity of the light is increased.

16. The display device according to claim 11, wherein the liquid crystal panel is configured to selectively rotate the vibration plane of incident linearly polarized light.

* * * * *